United States Patent

[11] 3,611,187

[72] Inventors Larry M. Osterink
Mountain View;
Jack D. Foster, Los Altos, both of Calif.
[21] Appl. No. 824,622
[22] Filed May 14, 1969
[45] Patented Oct. 5, 1971
[73] Assignee Sylvania Electric Products, Inc.

[54] MODE-LOCKED LASER MODULATED BY A TRAIN OF STABILIZED NONDAMPED RELAXATION PULSES
2 Claims, 4 Drawing Figs.

[52] U.S. Cl. .................................................. 331/94.5, 350/160
[51] Int. Cl. ................................................. H01s 3/10
[50] Field of Search ........................................... 331/94.5; 250/199; 332/7.51; 350/160

[56] References Cited
OTHER REFERENCES

Harris et al., Controlling Laser Oscillation. Electronics (Sept. 20, 1965) pp. 101-105

Primary Examiner—William L. Sikes
Attorneys—Norman J. O'Malley, John F. Lawler and Russell A. Cannon ABSTRACT: The intracavity $LiNbO_3$ optical modulator in this mode-locked Nd:YAG laser is modulated at a frequency that is different from the laser intermode frequency $c/2L$ by the natural relaxation oscillation frequency associated with the lasing medium.

INVENTORS
LARRY M. OSTERINK
JACK D. FOSTER

MODE-LOCKED LASER MODULATED BY A TRAIN OF STABILIZED NONDAMPED RELAXATION PULSES

BACKGROUND OF THE INVENTION

This invention relates to lasers which exhibit relaxation oscillations in the outputs thereof.

A laser is inherently a multimode device which oscillates simultaneously in many modes or frequencies because the cavity resonator thereof is many wavelengths long at these optical frequencies. Although the frequency spacings between adjacent modes are equal, the phases and amplitudes of the modes are different. Many solid-state lasers also exhibit damped relaxation oscillations in the outputs thereof. These oscillations are caused by transient conditions such as mechanical vibration of or noise in the laser. The relaxation oscillations associated with each lasing medium have a characteristic relaxation frequency that is a function of the relaxation rates of the upper and lower lasing levels and the level of pump excitation. As defined on page 10-71 of "An Introduction to LASERS AND MASERS," preliminary edition, by A. E. Siegman, McGraw-Hill Book Company, Copyright 1968, the relaxation frequency $\omega_s$ is representative as $$\omega_s = \sqrt{\frac{r-1}{\tau_2 \tau_{cav}} - \left(\frac{r}{2\tau_2}\right)^2} \quad (1)$$

where $r = R_p/R_p^{th}$ is the normalized pumping rate above threshold, $R_p$ is the pumping rate, $R_p^{th}$ is the threshold pumping rate, $\tau_2$ is the total lifetime of level 2 and $\tau_{cav}$ is the cavity lifetime of or cavity energy decay time. The decay time $\tau_s$ of the relaxation oscillations is representable as $$\tau_s = \frac{2\tau_2}{r} \quad (2)$$

Although these relaxation oscillations damp out so that the laser power output approaches a constant value, these oscillations are continually reexcited by noise in the laser.

In order to stabilize a laser and maintain the amplitudes of the modes in the output thereof more nearly constant the laser is mode locked. Prior art methods of mode locking a laser include modulating the loss of the cavity, modulating the length of the cavity and modulating the phase retardation of an intracavity element such as a lithium niobate crystal at or near a frequency equal to an integral multiple of the laser intermode frequency spacing $c/2L$. The result is a train of optical pulses or modes having frequency spacings of $c/2L$ and definite phase and amplitude relations. This mode-locked laser is still susceptible to transient conditions, however, for exhibiting damped relaxation oscillations in the output thereof. Mode locking of lasers is described on pages 1463-1465, Journal of Applied Physics, Vol. 39, No. 9, Aug. 1968.

An object of this invention is the provision of a laser producing a train of mode-locked laser pulses modulated by nondamped optical relaxation pulses.

SUMMARY OF THE INVENTION

In accordance with this invention, the optical pulse train in the output of a mode-locked laser is modulated by stable nondamped relaxation oscillation pulses by detuning the frequency at which the modulation mechanism is driven to mode lock the laser by the natural relaxation oscillation frequency of the laser.

DESCRIPTION OF PREFERRED EMBODIMENT

Figure 1:
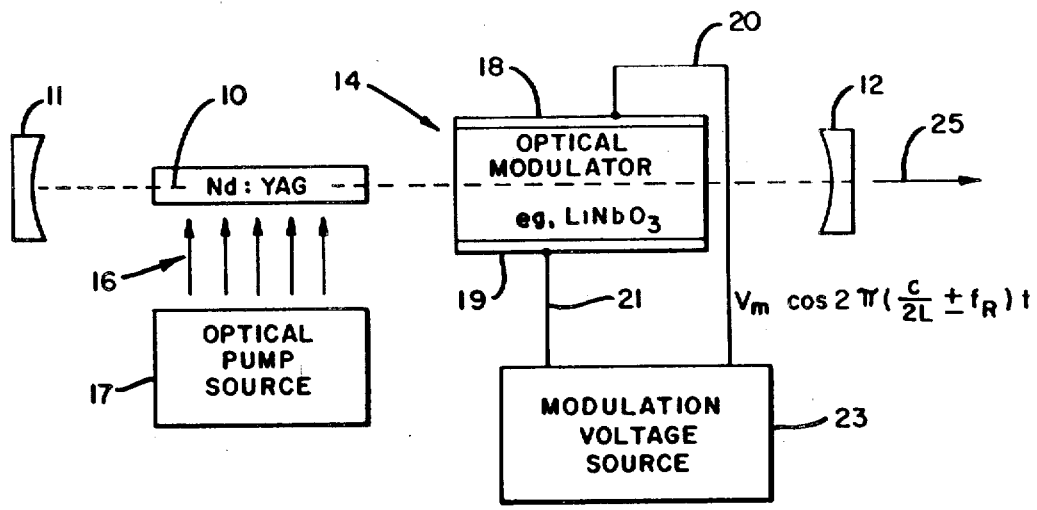
FIG. 1 is a schematic diagram of a laser embodying this invention.

The mode-locked laser illustrated in FIG. 1 comprises an active laser material 10 located in a high Q resonant cavity defined by partially and fully reflecting mirrors 11 and 12, respectively, which are spaced from opposite ends of the laser material. An optical modulator 14 is also located in the cavity and is axially aligned with the laser material and the mirrors.

The laser material may be a cylindrical rod of material that is capable of lasing and exhibiting damped relaxation oscillations in the output thereof. These oscillations occur in the outputs of most solid-state lasers. The lasing material may, by way of example, be a cylindrical rod of yttrium iron garnet which is doped with neodymium. Light rays 16 from optical pump source 17 excite the neodymium atoms to produce a population inversion and lasing in the rod. The pump source may be a tungsten filament or an arc lamp which is operated continuously.

Modulator 14 may, by way of example, be a rectangular crystal of lithium niobate ($LiNbO_3$) having planar parallel electrodes 18 and 19 bonded to opposite sides thereof. Electrodes 18 and 19 are connected through lines 20 and 21 to a source 23 of modulation voltage. Source 23 comprises a radiofrequency oscillator producing a sinusoidal modulation voltage.

The modulation voltage causes the refractive index of the crystal along the induced axis to vary. This effectively varies the optical path length of the cavity and causes a phase modulation of light passed by the crystal.

Figure 2A:
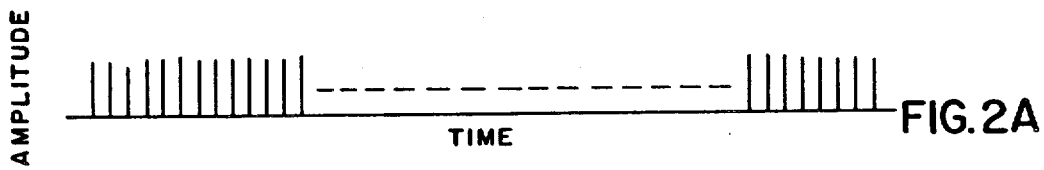
FIGS. 2A, 2B and 2C are waveforms illustrating the optical output of the laser of FIG. 1.

In a prior art intracavity-phased modulator, the output of source 23 modulates the refractive index of the crystal at modulation frequency that is an integral multiple of the laser intermode frequency $c/2L$ in order to lock the modes so that they have definite phase and amplitude relations. The output of the laser in response to this modulation voltage is represented by the waveform of FIG. 2A.

Figure 2B:
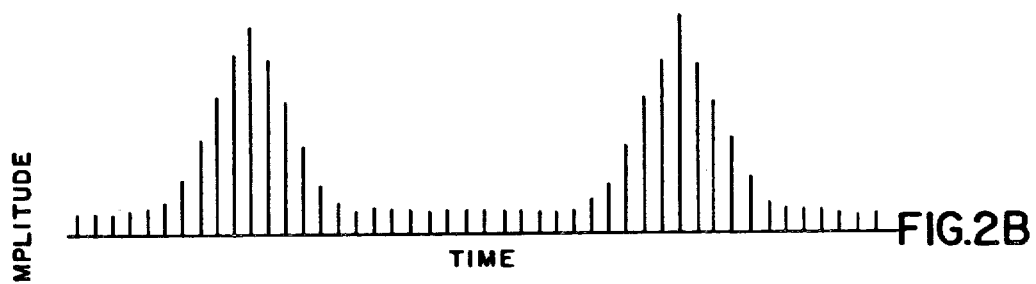
Figure 2C:
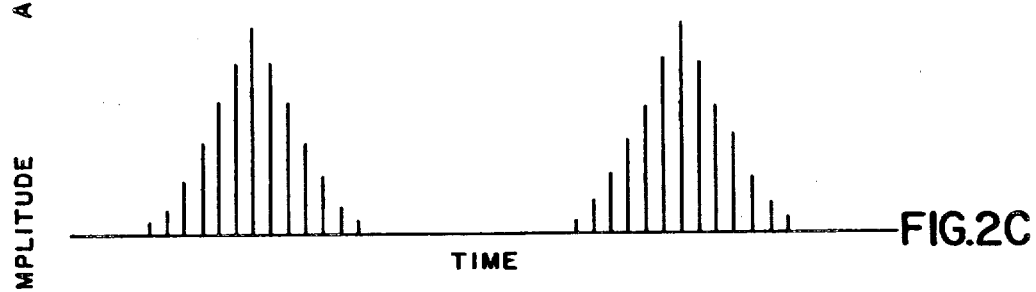

In accordance with this invention the modulation voltage produced by source 23 is representable as $$V_m \cos 2\pi \left(\frac{c}{2L} \pm f_r\right) t \quad (3)$$

where $V_m$ is the maximum bias voltage, $\pi$ is a constant, $f_r$ is the relaxation oscillation frequency, and $t$ is time. Stated differently, the modulation frequency is detuned from an integral multiple of the laser intermode frequency $c/2L$ by the natural relaxation frequency $f_r$ of the laser medium 10. This causes the refractive index of the crystal along the induced axis to vary in a complex manner to cause the output light beam 25 to comprise stable nondamped relaxation oscillation pulses which modulate the locked modes. This output of the laser is illustrated in FIGS. 2B and 2C. The waveform of FIG. 2B represents the output of the laser when the power level of the optical output 16 of the pump source 17 is much greater than the lasing threshold level of the laser material 10. The waveform of FIGURE 2C represents the output of the laser when the power level of the optical output 16 of the pump source is only slightly greater than that required for lasing. These outputs of the laser contain significantly more second harmonic power than the output of the free-running lasor or the conventional mode-locked laser. This enhancement in second harmonic power occurs as a result of temporal bunching of photons when the relaxation pulses are induced. This feature of the invention is particularly important in applications where quasi-CW nonlinear optical devices are employed.

In an embodiment of this invention which was actually built and tested, the laser material 10 was a cylindrical rod of Nd:YAG that was 3 mm. in diameter and 63 mm. long. The optical modulator comprised a lithium niobate crystal. The modulation frequency of source 23 was detuned from the laser intermode frequency of 400 mHz. by the natural relaxation oscillation frequency of approximately 30 kHz. of the Nd:YAG rod. The pulse repetition frequency of the stable nondamped relaxation pulses is equal to the relaxation oscillation frequency. The width of these pulses is equal to approximately 10 $\mu$sec. The optical output of this laser did not exhibit randomly induced relaxation oscillations. Average second harmonic powers in the output of this mode-locked Nd:YAG laser were 140 times greater than the second harmonic power of the free-running Nd:YAG laser and five times greater than the average second harmonic power in the conventional mode-locked laser.

As described in the article entitled "FM Oscillation In The He-Ne Laser" by S. E. Harris and Russell Targ, Applied Physics Letters, Vol. 5, No. 10, Nov. 15, 1964, page 202, the intracavity phase modulator 14 is driven at a modulation frequency which is approximately but not exactly equal to the axial mode spacing $c/2L$ to produce an optical output in which the laser modes oscillate with FM phases and nearly Bessel function amplitudes. In accordance with this invention, this modulation frequency may also be detuned by the natural relaxation oscillation frequency of the laser medium to cause the laser modes oscillating with FM phases and nearly Bessel function amplitudes to be modulated by the stable nondamped relaxation oscillation pulses.

Although an intracavity phase modulator is illustrated in the laser of FIG. 1, it is also possible to produce the same effect by connecting the laser mirror to a piezoelectric crystal to which the modulation voltage is applied. The crystal vibrates the mirror and thus modulates the length of the resonator. This causes the output of this laser to also contain stable nondamped relaxation oscillation pulses which modulate the train of mode-locked optical pulses. Thus, it is seen that this invention may be employed with any technique for mode locking a laser in which the modulation element is driven at a frequency near or equal to the laser intermode frequency $c/2L$.

What is claimed is:

1. The method of producing a train of stable nondamped relaxation pulses in the output of a mode-locked laser that exhibits damped relaxation oscillations in the output thereof and is mode locked by modulating an associated modulator element that is coupled to the laser at a modulation frequency that is substantially equal to an integral multiple of the laser intermode frequency spacing $c/2L$ where $c$ is the velocity of light and L is the length of the cavity, comprising the step of modulating said modulator at a frequency that is different from said modulation frequency by the relaxation oscillation frequency associated with the laser for mode locking the laser.

2. A mode-locked laser comprising a resonant cavity comprising a pair of at least partially reflecting mirrors.

a laser material located in said cavity, said material being capable of exhibiting damped relaxation oscillations in the output thereof, a pump source associated with said laser material for causing the latter to lase, a modulator element oriented for receiving and modulating light from and redirecting modulated light to said cavity for mode locking the laser, and means for driving said element at a modulation frequency that is detuned from a modulation frequency that is substantially equal to an integral multiple of the laser intermode frequency spacing $c/2L$, where $c$ is the velocity of light and L is the length of the resonant cavity, by the relaxation oscillation frequency associated with the laser for mode locking the laser.